(No Model.)
D. C. D. WHITCOMB.
WINDMILL.
No. 435,575. Patented Sept. 2, 1890.
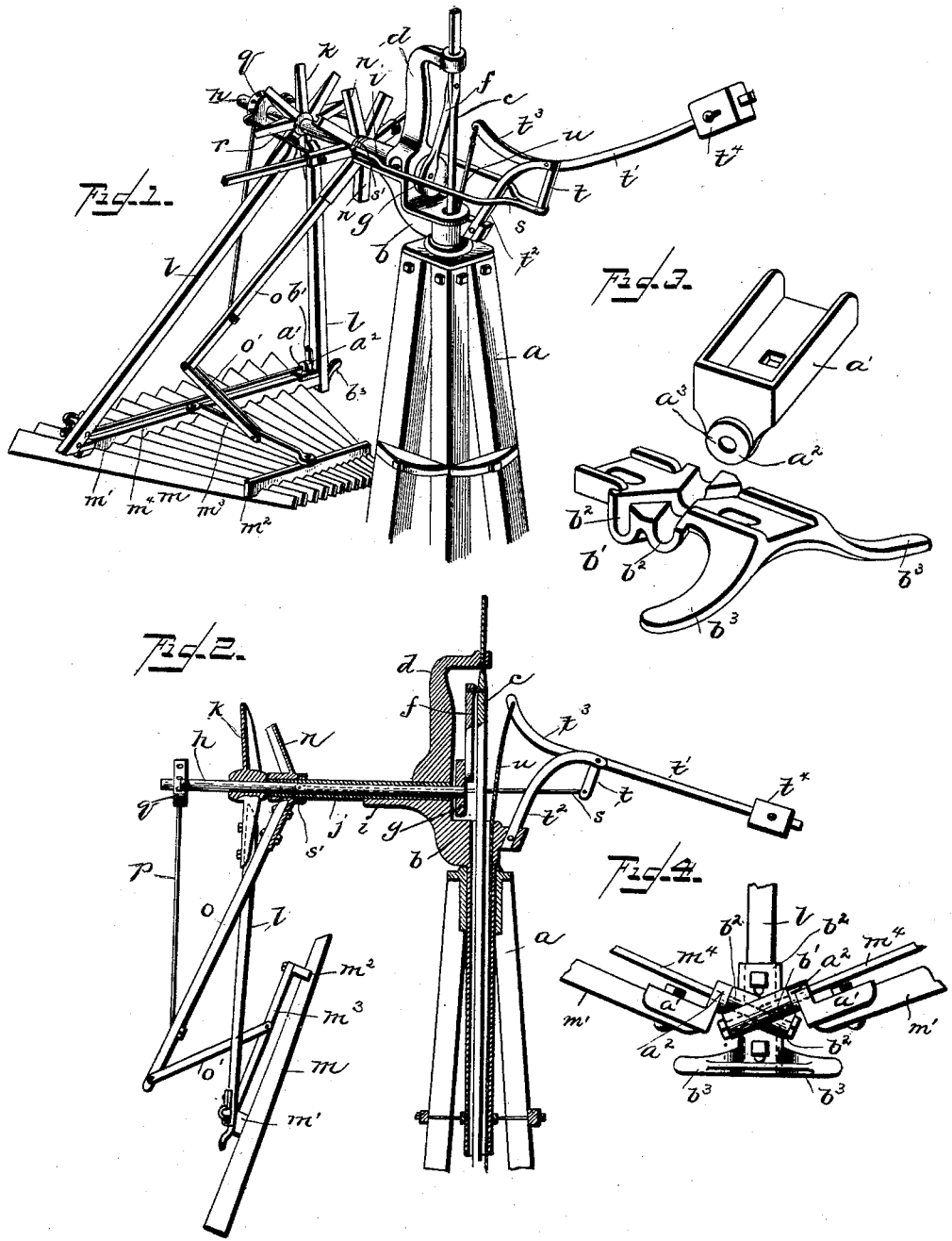
WITNESSES
H. A. Smith
H. Y. Davis
INVENTOR
Daniel C. D. Whitcomb
by Wm. N. Finnell
Attorney

UNITED STATES PATENT OFFICE.

DANIEL C. D. WHITCOMB, OF HOLDREGE, NEBRASKA, ASSIGNOR TO THE HOLDREGE MANUFACTURING COMPANY, OF SAME PLACE.

WINDMILL.

SPECIFICATION forming part of Letters Patent No. 435,575, dated September 2, 1890.

Application filed April 19, 1890. Serial No. 348,708. (No model.)

*To all whom it may concern:*

Be it known that I, DANIEL CURTIS DWIGHT WHITCOMB, a citizen of the United States, residing at Holdrege, in the county of Phelps and State of Nebraska, have invented a certain new and useful Improvement in Windmills, of which the following is a full, clear, and exact description.

The object of this invention is to provide for facilitating the operation of the fans or wings of a windmill so as to put them in position for use and to throw them out of such position.

The invention consists in fan-shifting mechanism constructed and arranged to operate substantially as I will proceed now to describe, and finally point out in the claims.

In the accompanying drawings illustrating my invention, in the several figures of which like parts are similarly designated, Figure 1 is a perspective view of sufficient of a windmill to show my invention, the fan being out of gear. Fig 2 is a sectional elevation. Fig. 3 shows in perspective the irons for connecting the fans in pairs, and Fig. 4 shows in plan the connected irons of adjacent fans.

The tower $a$, and the means for mounting the wheel upon such tower, may be of approved construction. In the construction shown I have employed a bracket-arm $b$, having a tubular extension within the tower in which the main pitman $c$ works.

$d$ is the upper guide, and $f$ is a pitman connecting the main pitman $c$ with the crank $g$ on the main shaft $h$ of the wheel. The shaft $h$ is secured in bearings $i$ in any suitable or approved manner. As shown, these bearings are made by the juncture of the bracket $b$ and the upper guide $d$. Fixed in the bearings is a sleeve $j$.

Fixed to the shaft $h$ is a spider $k$, having a number of radial arms, in which are secured the arms $l$, from the ends of which the fans or wings $m$ are suspended, or, rather, to which the said fans or wings are pivoted. The spider $k$ is made fast to the shaft $h$, and rotates with the said shaft as it is impelled by the fans or wings.

A concave spider $n$ is arranged to turn loosely upon the sleeve $j$, and the radial arms of this spider $n$ have secured in them the arms $o$. These arms $o$ are braced by rods $p$, extending from near their lower ends to a disk $q$, and also by means of transverse rods $r$, which extend from the spider to the said disk $q$. The disk $q$ is arranged to turn loosely and slide upon the shaft $h$. Each wing or fan $m$ has ribs $m'$ $m^2$, and between these ribs is arranged a bar $m^3$. The arms $o$ are connected to the bars $m^3$, and about midway of the length of the said bars, by means of links or levers $o'$, which are jointed both to the said bars and to the said arms.

The spider $n$ is connected by a yoke $s$ to an arm $t$ of a lever $t'$. This yoke is connected to the hub of the spider by a band $s'$, so as to permit the spider to revolve freely. This lever $t'$ has its bearings in a bracket $t^2$, suitably mounted upon the bracket $b$. An arm $t^3$ of the lever $t'$ projects from the arm $t$ toward the wheel, and has attached to it a cord or wire, or other device $u$, leading down through the tower into position to be actuated. The lever $t'$ may be provided with any suitable counterbalancing device $t^4$. Now it will be observed that as the arm $t^3$ of the lever $t'$ is depressed the arm $t$ will be moved in the direction from the tower, and the spider $n$ and the connected disk $q$ will be moved toward the tower, and so throw the wheel out of gear, as shown in Fig. 1. As soon as this downward pressure upon the lever is released the counter-balance thereon will be sufficient to reverse the movement last described and bring the parts into operative position, as shown in Fig. 2.

The preferred means employed for pivoting the fans or wings to the arms $l$ will be described now.

Referring to Fig. 3, I employ a casting $a'$, one of which is fitted to each end of the rib $m'$ of each wing, with the projection $a^2$ standing upwardly. The projection $a^2$ has the opening $a^3$. The pivot-rod $m^4$ of each wing or fan is passed through the openings $a^3$ in these castings. At the ends of the arms $l$ $l'$ are applied the castings $b'$, and these castings are provided with cavities $b^2$ $b^2$, which are arranged one above the other and are crossed obliquely, and which receive the pivot-rods $m^4$ from adjacent wings, and the said pivot-rods are then fastened on the outsides of these castings $b'$ by nuts or other suitable means.

The castings $b'$ are provided with laterally-extended arms $b^3$, which co-operate with the laterally-extended ribs $m'$ to serve as stops for the wings or fans when they are out of gear.

While the pivoting devices just described form part of this invention, I do not wish to be understood as limiting the other features of the invention to the inclusion of these particular forms of pivoting devices.

What I claim is—

1. In a windmill, a main shaft, a spider fixed thereon and provided with arms, and fans or wings pivoted to said arms, combined with a fixed sleeve, a concave spider movable longitudinally upon said sleeve and rotatable thereon, and having arms extending downwardly toward and outwardly from the fans or wings, a disk adapted to rotate and slide upon the main shaft and rigidly connected by longitudinal and transverse braces with the sliding spider, a jointed connection between the arms of the sliding spider and the wings or fans, a yoke connected to the said spider, and a device for moving the said yoke, substantially as and for the purpose described.

2. In a windmill, the fans and their supporting-arms, combined with pivot-rods, castings on the ends of the fans to receive the said pivot-rods, and castings $b'$ on the ends of the arms by which the fans are supported, the said castings $b'$ having cavities $b^2 b^2$ arranged one above the other and crossed obliquely to receive the pivot-rods of adjacent fans, substantially as and for the purpose described.

In testimony whereof I have hereunto set my hand this 3d day of April, A. D. 1890.

D. C. D. WHITCOMB.

Witnesses:
 PETER PEERSON,
 E. M. ROBBINS.